(12) United States Patent
Takazoe (10) Patent No.: US 9,100,433 B2
(45) Date of Patent: Aug. 4, 2015

(54) COMMUNICATIONS CONTROL DEVICE, COMMUNICATIONS SYSTEM, AND PROGRAM

(75) Inventor: Tomoki Takazoe, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 211 days.

(21) Appl. No.: 13/811,515

(22) PCT Filed: Jul. 27, 2011

(86) PCT No.: PCT/JP2011/067079
§ 371 (c)(1),
(2), (4) Date: Jan. 22, 2013

(87) PCT Pub. No.: WO2012/014931
PCT Pub. Date: Feb. 2, 2012

(65) Prior Publication Data
US 2013/0124711 A1    May 16, 2013

(30) Foreign Application Priority Data

Jul. 27, 2010  (JP) ................................ 2010-168370

(51) Int. Cl.
*G06F 15/16* (2006.01)
*H04L 29/06* (2006.01)
(Continued)

(52) U.S. Cl.
CPC ............ *H04L 63/1466* (2013.01); *H04L 45/02* (2013.01); *H04L 61/1511* (2013.01); *H04L 61/2015* (2013.01); *H04L 61/6059* (2013.01); *H04L 63/0236* (2013.01)

(58) Field of Classification Search
CPC ........................................................ H04L 45/02
USPC ................................................. 709/223, 224
See application file for complete search history.

(56) References Cited

U.S. PATENT DOCUMENTS 7,266,090 B2 *  9/2007  Sawada et al. ................ 370/254
2004/0028061 A1  2/2004  Sawada et al.
(Continued)

FOREIGN PATENT DOCUMENTS

| JP | 2001-211180 A | 8/2001 |
| JP | 2006-324723 A | 11/2006 |
| WO | 2004/042999 A1 | 5/2004 |

OTHER PUBLICATIONS

International Search Report for corresponding International Application No. PCT/JP2011/067079 mailed Aug. 23, 2011.
(Continued)

Primary Examiner — Adnan Mirza
(74) Attorney, Agent, or Firm — Renner, Otto, Boisselle & Sklar, LLP (57) ABSTRACT

A communication control apparatus (1) is connected to a router (6) and a terminal device (4), and upon receiving prefix information transmitted from the router (6) by a router advertisement, stores the prefix information. In a case where prefix information of a transmission source address or a destination address, which is included in the received communication packet, is different from the stored prefix information, the communication control apparatus (1) blocks the communication packet, and in a case where the prefix information of the transmission source address or the destination address, which is included in the received communication packet, is the stored prefix information, the communication control apparatus (1) allows passing of the communication packet. In such a way, an unauthorized communication packet can be blocked appropriately under an IPv6 network environment.

6 Claims, 5 Drawing Sheets (51) Int. Cl.
*H04L 12/751* (2013.01)
*H04L 29/12* (2006.01)

(56) References Cited

U.S. PATENT DOCUMENTS

| | | | |
|---|---|---|---|
| 2004/0117473 | A1 | 6/2004 | Yamamura et al. |
| 2005/0041671 | A1* | 2/2005 | Ikeda et al. ............... 370/395.52 |
| 2006/0067321 | A1 | 3/2006 | Satou |
| 2006/0155853 | A1 | 7/2006 | Nesz et al. |

OTHER PUBLICATIONS

Form PCT/ISA/237 for corresponding International Application No. PCT/JP2011/067079 dated Aug. 23, 2011.

Extended European Search Report May 13, 2015 for corresponding European Application No. 11812520.2.

Nordmark et al., "FCFS-SAVI: First-Come First-Serve Source-Address Validation for Locally Assigned Addresses", Jul. 12, 2010, BNSDOCID: XP15070051A.

Ferguson et al., "Network Ingress Filtering: Defeating Denial of Service Attacks which employ IP Source Address Spooling", May 2000, BNSDOCID: XP15008610A.

Donely et al., "Use Cases and Requirements for an IPv6 CPE Router", Jul. 2, 2009, BNSDOCID: XP15062952A.

Bi et al., "SAVI Solution for DHCP", May 28, 2010, BNSDOCID: XP15068711A.

* cited by examiner

| PREFIX | DNS SERVER ADDRESS | REACHABLE TIME | TERMINAL-ASSIGNED ADDRESS | TERMINAL-MAC ADDRESS |
|---|---|---|---|---|
| | | | | |
| | | | | |
| | | | | |

COMMUNICATIONS CONTROL DEVICE, COMMUNICATIONS SYSTEM, AND PROGRAM

TECHNICAL FIELD

The present invention relates to a communication control device, a communication system, and a program, which perform passing or blocking of a communication packet.

BACKGROUND ART

Heretofore, in an IP (Internet Protocol) v4 network, a terminal device has assigned an IPv4 address thereto from a DHCP (Dynamic Host Configuration Protocol) server. In this environment, a DHCP packet has been monitored and captured by a firewall. In the case where the terminal device makes communication by using an address other than the IPv4 address assigned thereto from the DHCP server, then the IPv4 packet concerned is blocked by the firewall.

For example, in the following Patent Literature 1, it is described that an IPv4 packet of which IPv4 address is not the IPv4 address assigned from the DHCP server is not allowed on communication by a switching hub. Moreover, as another example, in the following Patent Literature 2, it is described that the IPv4 packet of which IPv4 address is not the IPv4 address assigned from the DHCP server is regulated by a network apparatus.

CITATION LIST

Patent Literature

[PTL 1] Japanese Patent Laid-Open Publication No. 2001-211180 (Claim 3, FIG. 7, and the like)
[PTL 2] Japanese Patent Laid-Open Publication No. 2004-180211 (Claim 3, FIG. 11, and the like)

SUMMARY OF INVENTION

Incidentally, as methods by which the terminal device acquires an IPv6 address under the IPv6 network environment, for example, the following two are mentioned. First, there is a method by which the terminal device automatically creates the IPv6 address by using a prefix (network address) included in a router advertisement message (RA: Router Advertisement) transmitted from a router. Second, there is a method by which the terminal device acquires an IPv6 address acquired from a DHCPv6 server.

However, under the IPv6 network environment, there is no technology for automatically configuring a rule for blocking an IPv6 packet with an unauthorized IPv6 address as in the IPv4 network as mentioned above.

In this connection, the present invention has been proposed in consideration of the actual circumstances as mentioned above. It is an object of the present invention to provide a communication control device, a communication system and a program, which are capable of appropriately blocking the unauthorized communication packet under the IPv6 network environment.

A communication control device according to a first aspect includes: transmitter/receiver for receiving prefix information transmitted from a router by a router advertisement, the transmitter/receiver being connected to at least the router and a terminal device that transmits/receives a communication packet thereto/therefrom; storage for storing the prefix information received by the transmitter/receiver; and controller for blocking the communication packet received by the transmitter/receiver in a case where prefix information of a transmission source address or a destination address, the prefix information being included in the communication packet, is different from the prefix information stored in the storage, and allowing passing of the received communication packet in a case where the prefix information of the transmission source address or the destination address, the prefix information being included in the communication packet, is the prefix information stored in the storage.

A communication control device according to a second aspect is the communication control device according to the first aspect, wherein, in a case where DNS server information is transmitted to the transmitter/receiver by the router advertisement, the storage stores DNS server address information included in the DNS server information, and in a case where a destination address of a communication packet transmitted from the terminal device is the DNS server address stored in the storage, the controller allows passing of the communication packet, and in a case where the destination address included in the communication packet is different from the DNS server address stored in the storage, the controller blocks the communication packet.

A communication control device according to a third aspect is the communication control device according to the first aspect, wherein, in a case where a reachable time of the terminal device is designated by the router advertisement, the storage stores in advance the reachable time and a point of time when a reachability confirmation packet of a communication packet transmitted from the terminal device is received by the transmitter/receiver, and in a case where a time from the point of time when the reachability confirmation packet is received until a point of time when the communication packet transmitted from the terminal device is received does not exceed the reachable time for the terminal device, the controller allows passing of the communication packet, and in a case where the time from the point of time when the reachability confirmation packet is received until the point of time when the communication packet transmitted from the terminal device is received exceeds the reachable time for the terminal device, the controller blocks the communication packet until next receiving the reachability confirmation packet from the terminal device.

A communication control device according to a fourth aspect is the communication control device according to the first aspect, wherein the transmitter/receiver is connected to a DHCP (Dynamic Host Configuration Protocol) server, in a case where it is designated by the router advertisement that the terminal device uses an address assigned thereto by the DHCP server, the storage stores address information assigned to the terminal device by the DHCP server, and in a case where a transmission source address included in a communication packet received by the transmitter/receiver is included as the address information stored in the storage, the controller allows passing of the communication packet, and in a case where the transmission source address included in the received communication packet is not included as the address information stored in the storage, the controller blocks the communication packet.

A communication control device according to a fifth aspect is the communication control device according to the fourth aspect, wherein, in a case where it is designated by the router advertisement that the terminal device uses DNS server address information assigned thereto by the DHCP server, the storage stores the DNS server address information assigned by the DHCP server, and in a case where a port number in a communication packet transmitted from the terminal device is DNS, the controller allows passing of the communication packet when a destination address of the communication packet is included as the DNS server address information stored in the storage, and blocks the communication packet when the destination address of the communication packet is not included as the DNS server address information stored in the storage.

A communication control device according to a sixth aspect is the communication control device according to the first aspect, wherein, in a case where the terminal device transmits a message for detecting a duplicate address of an interface ID immediately after startup of the terminal device, the storage stores the interface ID of the terminal device, the interface ID being included in the message, and in a case where an interface ID included in a communication packet transmitted from the terminal device coincides with the interface ID stored in the storage, the controller allows passing of the communication packet, and in a case where the interface ID included in the communication packet transmitted from the terminal device does not coincide with the interface ID stored in the storage, the controller blocks the communication packet.

A communication system according to a seventh aspect includes: a terminal device that transmits/receives a communication packet; a router that transmits prefix information by a router advertisement, and relays the communication packet transmitted/received by the terminal device; and a communication control device that controls blocking and passing of the communication packet, wherein the communication control device includes: transmitter/receiver for receiving the prefix information transmitted from the router by the router advertisement, the transmitter/receiver being connected to at least the router and the terminal device; storage for storing the prefix information received by the transmitter/receiver; and controller for blocking the communication packet received by the transmitter/receiver in a case where prefix information of a transmission source address or a destination address, the prefix information being included in the communication packet, is different from the prefix information stored in the storage, and allowing passing of the received communication packet in a case where the prefix information of the transmission source address or the destination address, the prefix information being included in the communication packet, is the prefix information stored in the storage.

A program of a communication control device according to an eighth aspect is a program to be executed by the communication control device, the program allowing the communication control device to function as: transmitter/receiver for receiving prefix information transmitted from a router by a router advertisement, the transmitter/receiver being connected to at least the router and a terminal device that transmits/receives a communication packet thereto/therefrom; storage for storing the prefix information received by the transmitter/receiver; and controller for blocking a communication packet received by the transmitter/receiver in a case where prefix information of a transmission source address or a destination address, the prefix information being included in the communication packet, is different from the prefix information stored in the storage, and allowing passing of the received communication packet in a case where the prefix information of the transmission source address or the destination address, the prefix information being included in the communication packet, is the prefix information stored in the storage.

In accordance with the present invention, the prefix information transmitted from the router by the router advertisement is stored in advance, and the communication packet is blocked in the case where the prefix information of the transmission source address or the destination address, which is included in the communication packet, is different from the stored prefix information. Accordingly, the unauthorized communication packet can be blocked appropriately under the IPv6 network environment.

DESCRIPTION OF EMBODIMENTS

A description is made below of an embodiment of the present invention with reference to the drawings.

Figure 1:
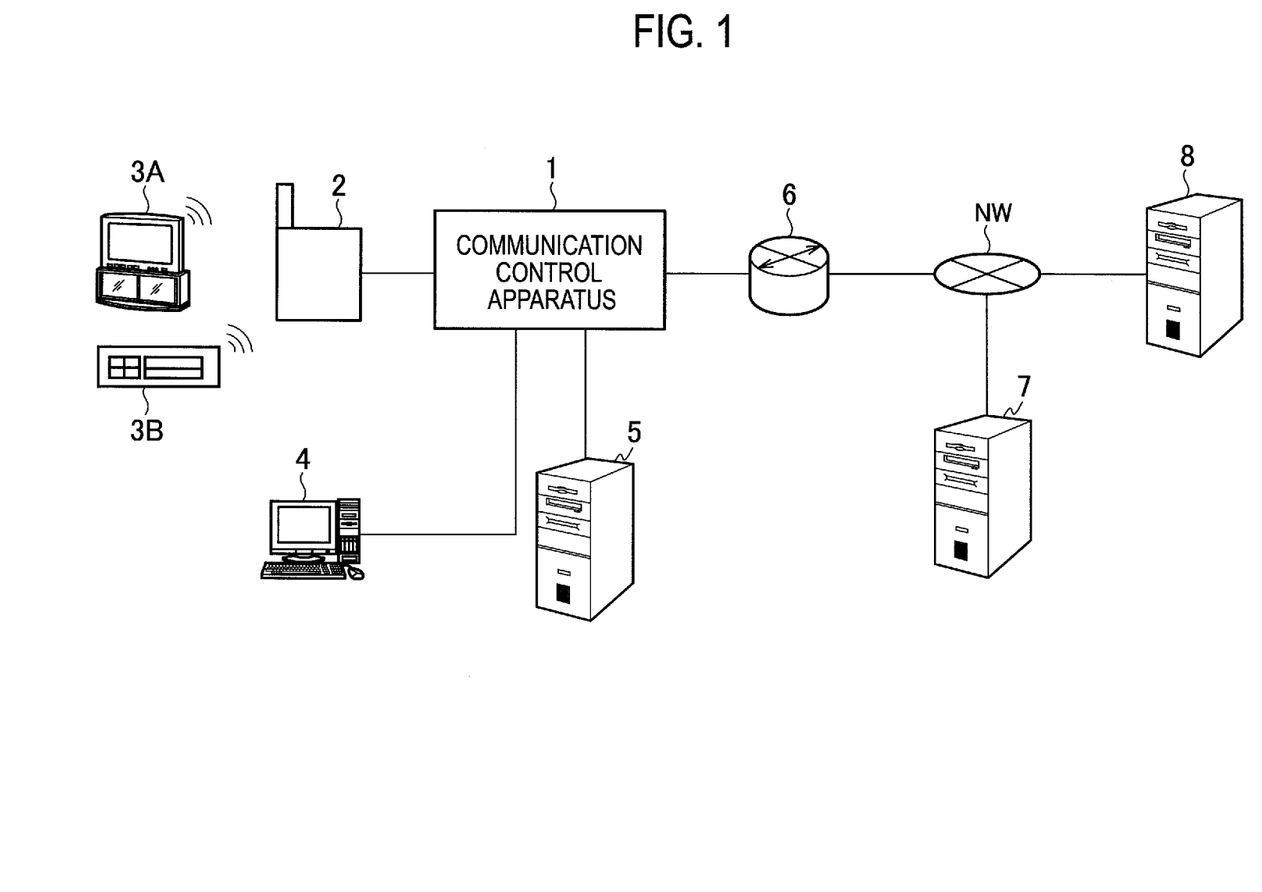
FIG. 1 is a block diagram showing a configuration of a communication system shown as an embodiment of the present invention.

A communication system shown as the embodiment of the present invention is configured, for example, as shown in FIG. 1. This communication system includes: a communication control apparatus 1; a wireless terminal device 2; home instruments 3A and 3B, a terminal device 4, a DHCP (Dynamic Host Configuration Protocol) v6 server 5, a router 6, a DNS server 7, and a communication apparatus 8. This communication system is a system that transmits/receives an IPv6 packet in accordance with IPv6.

The router 6 relays an IPv6 packet transmitted from the wireless terminal device 2 or the terminal device 4 through the communication control apparatus 1 to the communication apparatus 8 and the like, and moreover, relays an IPv6 packet, which is transmitted to the attention of the wireless terminal device 2 or the terminal device 4, to the communication control apparatus 1. This router 6 periodically transmits, as a router advertisement message, prefix information of a home network, which is connected to the communication control apparatus 1, to all nodes of the home network in a multicast manner. In such a way, the router 6 makes the prefix information, which is transmitted by the router advertisement message concerned, usable as a prefix that composes high-order 64 bits of an IPv6 address of the wireless terminal device 2 or the terminal device 4.

Moreover, in the router advertisement message, the router 6 can also include other information such as information of a DNS (Domain Name System) server which the wireless terminal device or the terminal device 4 in the home network accesses, an M flag, and an O flag.

The wireless terminal device 2 or the terminal device 4 acquires the IPv6 address, and transmits/receives the IPv6 packet by using the IPv6 address concerned as an IPv6 address of its own. In usual, the wireless terminal device 2 or the terminal device 4 creates a 128-bit IPv6 address by using the prefix information included in the router advertisement message and using an interface ID obtained from a MAC (Media Access Control) address set in itself.

As methods by which the wireless terminal device 2 or the terminal device 4 acquires the IPv6 address, two methods are mentioned. A first method is a method, in which the wireless terminal device 2 or the terminal device 4 acquires the prefix information included in the router advertisement message (RA) transmitted from the router 6, the prefix information concerned is defined as a network address of the high-order 64 bits, and low-order 64 bits are created from a MAC address of its own and are defined as the IPv6 address of its own. A second method as another method for acquiring the IPv6 address is a method of using an IPv6 address, which is assigned from the DHCPv6 server 5, as the IPv6 address of own of the wireless terminal device 2 or the terminal device 4. The wireless terminal device 2 or the terminal device 4 will use the IPv6 address acquired by either of the methods, and which of the IPv6 addresses is to be used is set arbitrarily.

The communication control apparatus 1, the wireless terminal device 2, the home instruments 3A and 3B and the terminal device 4 are provided, for example, in home. The communication control apparatus 1 functions as a firewall that monitors communication with the communication apparatus 8 or the DNS server 7, which the wireless device 2 and the terminal device 4 perform through an external network NW. In such a way, the communication control apparatus 1 blocks unauthorized communication between home and the outside.

In the case of permitting the communication, the communication control apparatus 1 allows passing of an IPv6 packet transmitted from the wireless terminal device 2 or the terminal device 4, and transfers the IPv6 packet concerned to the router 6, and in the case of blocking the communication, the communication control apparatus 1 discards the IPv6 packet transmitted from the wireless terminal device 2 or the terminal device 4. Moreover, in the case of permitting communication from the external network, which is on the network NW side from the router 6, to the home network, which is on the communication control apparatus 1 side from the router 6, the communication control apparatus 1 allows passing of an IPv6 packet transmitted from the external network, and transfers the IPv6 packet concerned to the wireless terminal device 2 or the terminal device 4. Meanwhile, in the case of blocking the communication from the external network to the home network, the communication control apparatus 1 discards the IPv6 packet transmitted from the external network.

Figure 2:
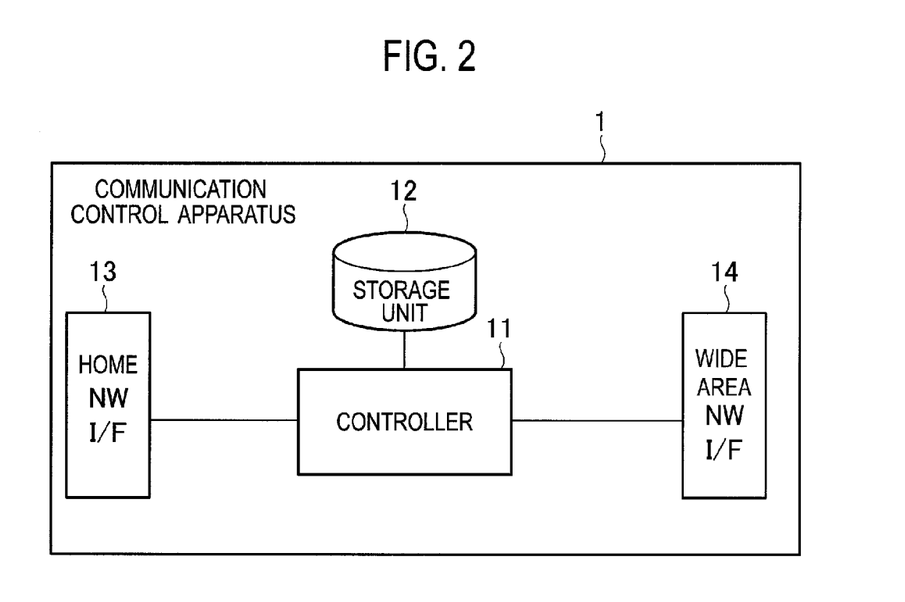
FIG. 2 is a block diagram showing a functional configuration of a communication control apparatus in the communication system shown as the embodiment of the present invention.

As shown in FIG. 2, the communication control apparatus 1 includes a controller 11, a storage unit 12, a home network I/F 13, a wide area network I/F 14.

The home network I/F 13 is connected to the wireless terminal device 2 and the terminal device 4, which transmit/receive the IPv6 packet thereto/therefrom. The wide area network I/F 14 is at least connected to the router 6. In this example, the wide area network I/F 14 is connected to the DHCPv6 server 5. The wide area network I/F 14 receives the prefix information transmitted from the router 6 by the router advertisement message.

Figure 3:
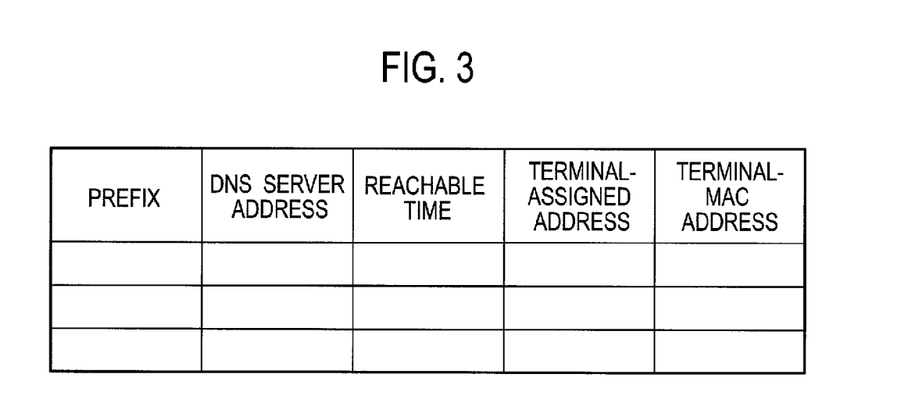
FIG. 3 is a table showing information stored in the communication control apparatus in the communication system shown as the embodiment of the present invention.

The storage unit 12 stores the prefix information received by the wide area network I/F 14. The storage unit 12 captures the information which the wireless terminal device 2 or the terminal device 4 communicates through the communication control apparatus 1, and stores various pieces of information including the prefix information, which are as shown in FIG. 3. Note that other pieces of the information will be described later.

The prefix information is included in the router advertisement message which the router 6 transmits to the attention of the wireless terminal device 2 or the terminal device 4, and is information acquired by capturing the router advertisement message concerned by the wide area network I/F 14. This prefix information is the network address that composes the high-order 64 bits in the IPv6 address of the wireless terminal device 2 or the terminal device 4.

In the above-mentioned communication system, there is such a case where a virus or a malicious attacker uses an unauthorized IPv6 address, or a case where a user of the wireless terminal device 2 or the terminal device 4 sets a wrong IPv6 address. Accordingly, the communication control apparatus 1 in the communication system performs such processing as will be described below.

First Example

In the case where prefix information of a transmission source IPv6 address or a destination IPv6 address, which is included in the IPv6 packet received by the home network I/F 13 or the wide area network I/F 14, is different from the prefix information stored in the storage unit 12, the controller 11 blocks the IPv6 packet concerned. Moreover, in the case where the prefix information of the transmission source IPv6 address or the destination IPv6 address, which is included in the IPv6 packet received by the home network I/F 13 or the wide area network I/F 14, is the prefix information stored in the storage unit 12, the controller 11 allows passing of the IPv6 packet concerned. In such a way, the controller 11 functions as controller for monitoring and blocking an unauthorized IPv6 packet.

The communication control apparatus 1 enables communication of only the wireless terminal device 2 or the terminal device 4, which has the IPv6 address in which the prefix information subjected to the router advertisement message by the router 6 is used as the high-order 64 bits. Hence, in accordance with this communication control apparatus 1, even if an unauthorized communication apparatus that has not received the router advertisement message by the router 6 transmits the IPv6 packet, such an unauthorized IPv6 packet concerned can be blocked.

Figure 4:
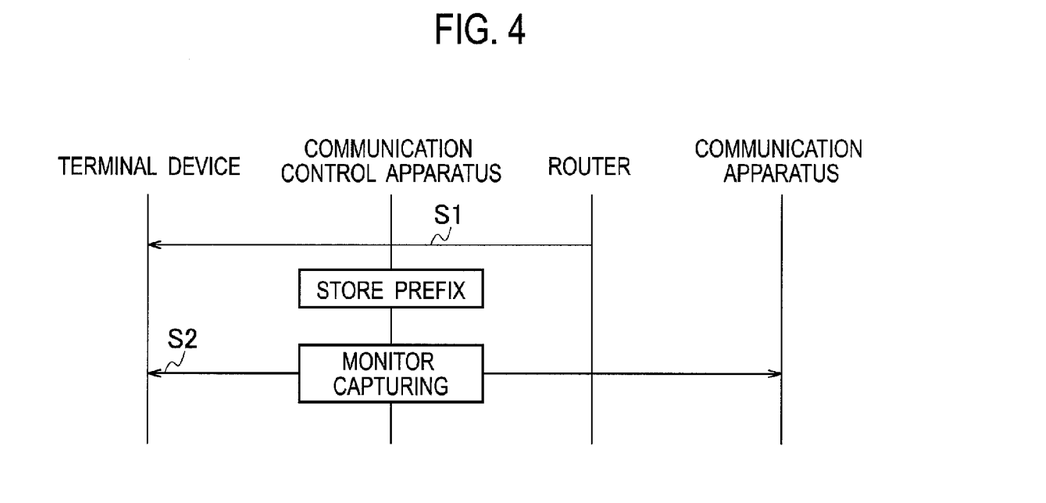
FIG. 4 is a sequence chart showing operations of a first example in the communication system shown as the embodiment of the present invention.

Specifically, as shown in FIG. 4, the communication control apparatus 1 captures a router advertisement message S1 transmitted periodically from the router 6. Then, the communication control apparatus 1 stores prefix information included in the router advertisement message S1.

Thereafter, in the case where the wireless terminal device 2 or the terminal device 4 transmits/receives an IPv6 packet S2 to/from the communication apparatus 8, the communication control apparatus 1 captures the IPv6 packet S2 concerned. Then, in the case where a prefix of an IPv6 address of the wireless terminal device 2 or the terminal device 4, which is included in the IPv6 packet S2 concerned, is the same as the prefix information stored in the storage unit 12, the communication control apparatus 1 permits communication of the IPv6 packet S2.

As described above, in accordance with the communication control apparatus 1, the prefix information transmitted by the router advertisement from the router 6 is stored in advance. Then, in the case where the prefix information of the transmission source IPv6 address or the destination IPv6 address, which is included in the IPv6 packet, is different from the stored prefix information, the communication control apparatus 1 blocks the IPv6 packet. In such a way, the unauthorized IPv6 packet can be appropriately blocked under the IPv6 network environment.

Second Example

Moreover, in the case where information of the DNS server 7 is transmitted by the router advertisement message transmitted from the router 6, the communication control apparatus 1 stores DNS server address information included in the DNS server information concerned.

In the case where the destination IPv6 address of the IPv6 packet transmitted from the wireless terminal device 2 or the terminal device 4 is the DNS server address stored in the storage unit 12, the controller 11 allows passing of the IPv6 packet concerned. Meanwhile, in the case where the IPv6 address included in the IPv6 packet concerned is different from the DNS server address stored in the storage unit 12, the controller 11 blocks the IPv6 packet concerned.

In such a way, the communication control apparatus 1 enables communication between only the DNS server 7 subjected to the router advertisement message by the router 6 and the wireless terminal device 2 or the terminal device 4.

Figure 5:
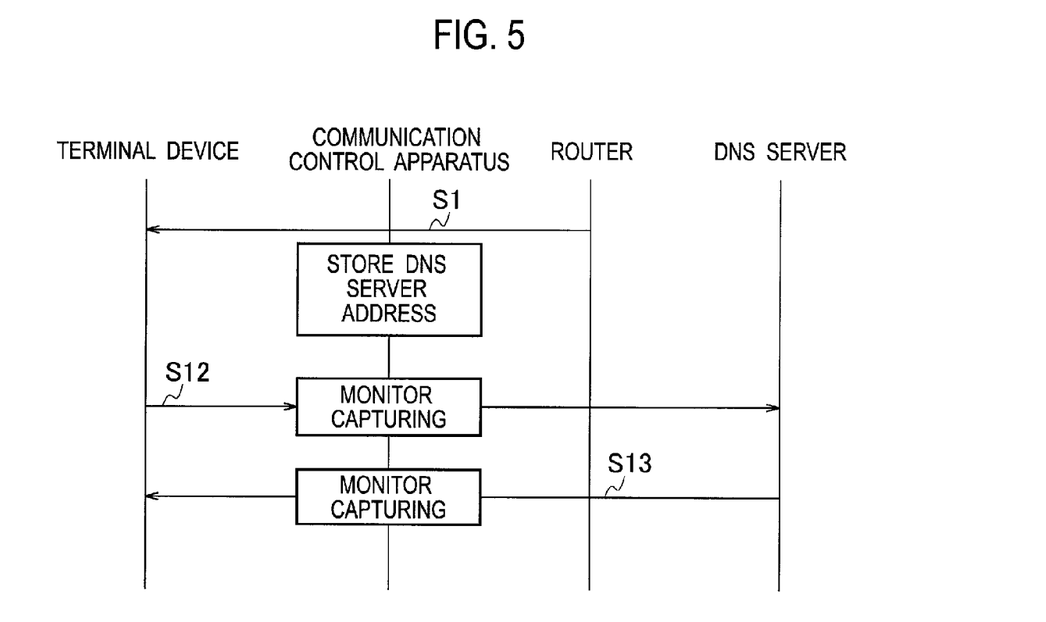
FIG. 5 is a sequence chart showing operations of a second example in the communication system shown as the embodiment of the present invention.

Specifically, as shown in FIG. 5, the communication control apparatus 1 captures a router advertisement message S11 transmitted periodically from the router 6. Then, the communication control apparatus 1 stores address information of the DNS server 7, which is included in the router advertisement message S11 concerned.

Thereafter, in the case where the wireless terminal device 2 or the terminal device 4 transmits an address request message S12, in which a host name is designated, to the DNS server 7, the communication control apparatus 1 captures the address request message S12 concerned. From a port number in TCP, the communication control apparatus 1 recognizes that the address request message S12 concerned uses DNS. Then, in the case where a destination IPv6 address included in the address request message S12 concerned is the same as the IPv6 address of the DNS server 7, which is stored in the storage unit 12, the communication control apparatus 1 permits communication of the address request message S12.

Upon receiving the address request message S12, the DNS server 7 acquires an IPv6 address of a communication apparatus corresponding to the host name included in the address request message S12 concerned. The DNS server 7 transmits an address response message S13, which is included in the IPv6 address concerned, to the wireless terminal device 2 or the terminal device 4.

The communication control apparatus 1 captures the address response message S13 concerned. From the port number in the TCP, the communication control apparatus 1 recognizes that the address response message S13 concerned uses the DNS. Then, in the case where a transmission source IPv6 address included in the address response message S13 is the same as the IPv6 address of the DNS server 7, which is stored in the storage unit 12, the communication control apparatus 1 permits communication of the address response message S13.

Note that, in this example, the DNS server address is designated by the router advertisement message transmitted from the router 6, and such an access from the wireless terminal device 2 or the terminal device 4 is allowed only to the DNS server; however, the same can also be applied to other servers. For example, in the case where the wireless terminal device 2 or the terminal device 4 is allowed to communicate only with a specific SIP (Session Initiation Protocol) server, an SIP server address is transmitted to the wireless terminal device 2 or the terminal device 4 through the communication control apparatus 1 by the router advertisement message. In such a way, the communication control apparatus 1 can block communication with other SIP servers than the specific SIP server.

As another example, in the case where the wireless terminal device 2 or the terminal device 4 is allowed to communicate only with a specific NTP (Network Time Protocol) server, an NTP server address is transmitted to the wireless terminal device 2 or the terminal device 4 through the communication control apparatus 1 by the router advertisement message. In such a way, the communication control apparatus 1 can block communication with other NTP servers than the specific NTP server.

Third Example

Moreover, in the case where a reachable time of the wireless terminal device 2 or the terminal device 4 is designated by the router advertisement message in the communication control apparatus 1, the storage unit 12 stores in advance the reachable time and a time when a reachability confirmation packet of the IPv6 packet transmitted from the wireless terminal device 2 or the terminal device 4 is received by the wide area network I/F 14. The reachability confirmation packet is a packet for confirming whether or not the IPv6 packet reaches a communication partner at the time of transmitting the IPv6 packet to the communication partner from the wireless terminal device 2 or the terminal device 4. This reachability confirmation packet is, for example, a packet transmitted by ICMP (Internet Control Message Protocol) v6.

In the case where a time from a point of time when the reachability confirmation packet is received until a point of time when the IPv6 packet transmitted from the wireless terminal device 2 or the terminal device 4 is received does not exceed the reachable time for the wireless terminal device 2 or the terminal device 4, the controller 11 allows passing of the IPv6 packet concerned. Meanwhile, in the case where the time from the point of time when the reachability confirmation packet is received until the point of time when the IPv6 packet transmitted from the wireless terminal device 2 or the terminal device 4 is received exceeds the reachable time for the wireless terminal device 2 or the terminal device 4, the controller 11 blocks the IPv6 packet until next receiving the reachability confirmation packet from the wireless terminal device 2 or the terminal device 4.

Figure 6:
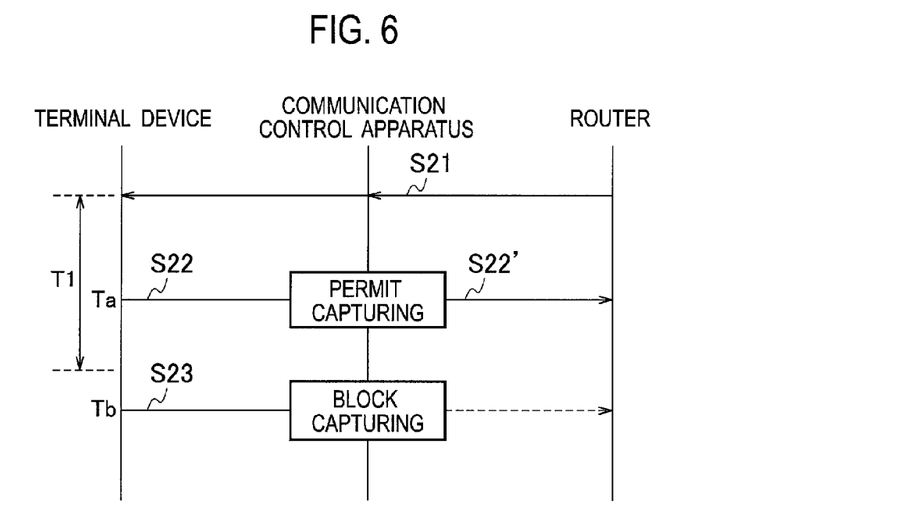
FIG. 6 is a sequence chart showing operations of a third example in the communication system shown as the embodiment of the present invention.

Specifically, as shown in FIG. 6, it is assumed that, when a router solicitation message S21 including a reachable time T1 is transmitted, an ICMPv6 packet S22 is transmitted from the wireless terminal device 2 or the terminal device 4 at a point of time Ta within the reachable time T1 concerned. Since the reachable time T1 has not elapsed at the time of having received the ICMPv6 packet S22, the communication control apparatus 1 permits the ICMPv6 packet concerned, and allows passing thereof.

Meanwhile, it is assumed that an ICMPv6 packet S23 is transmitted from the wireless terminal device 2 or the terminal device 4 or from a communication apparatus of the attacker at a point of time Tb after the reachable time T1 elapsed. In this case, since the reachable time T1 has elapsed at the time of having received the ICMPv6 packet S23 concerned, the communication control apparatus 1 blocks the ICMPv6 packet S23 concerned.

In such a way, in the case where the reachable time of the wireless terminal device 2 or the terminal device 4 is designated by the router advertisement message, the communication control apparatus 1 allows passing of the reachability confirmation packet, which is transmitted from the wireless terminal device 2 or the terminal device 4, only in the case where the reachability confirmation packet is within the reachable time at the time of having received the reachability confirmation packet. In such a way, the communication control apparatus 1 can permit the communication only within the reachable time, and can block communication out of the reachable time concerned as unauthorized communication.

Fourth Example

Still further, in the communication control apparatus 1, the wide area network I/F 14 is connected to the DHCPv6 server 5. In the case where it is designated by the router advertisement message that the wireless terminal device 2 or the terminal device 4 uses an IPv6 address assigned thereto by the DHCPv6 server 5, the storage unit 12 stores the IPv6 address assigned to the wireless terminal device 2 or the terminal device 4 by the DHCPv6 server 5.

At this time, the controller 11 determines whether or not the M flag in the router advertisement message is "1". In such a way, the communication control apparatus 1 determines that the IPv6 address assigned from the DHCPv6 server 5 is to be used as the IPv6 address of the wireless terminal device 2 or the terminal device 4. Here, as shown in FIG. 3, the storage unit 12 stores terminal information for identifying the wireless terminal device 2 or the terminal device 4 and the IPv6 address assigned by the DHCPv6 server 5 in association with each other.

In the case where the transmission source IPv6 address included in the IPv6 packet received by the home network I/F 13 and the wide area network I/F 14 is included as address information stored in the storage unit 12, the controller 11 allows passing of the IPv6 packet concerned. Meanwhile, in the case where the transmission source IPv6 address included in the received IPv6 packet is not included as the address information stored in the storage unit 12, the controller 11 blocks the IPv6 packet concerned.

In such a way, in the case where it is designated by the router advertisement message that the IPv6 address assigned by the DHCPv6 server 5 is used as the IPv6 address of the wireless terminal device 2 or the terminal device 4, the communication control apparatus 1 can block an IPv6 packet in which addresses other than the IPv6 address thus assigned are defined as the destination IPv6 address and the transmission source IPv6 address.

Figure 7:
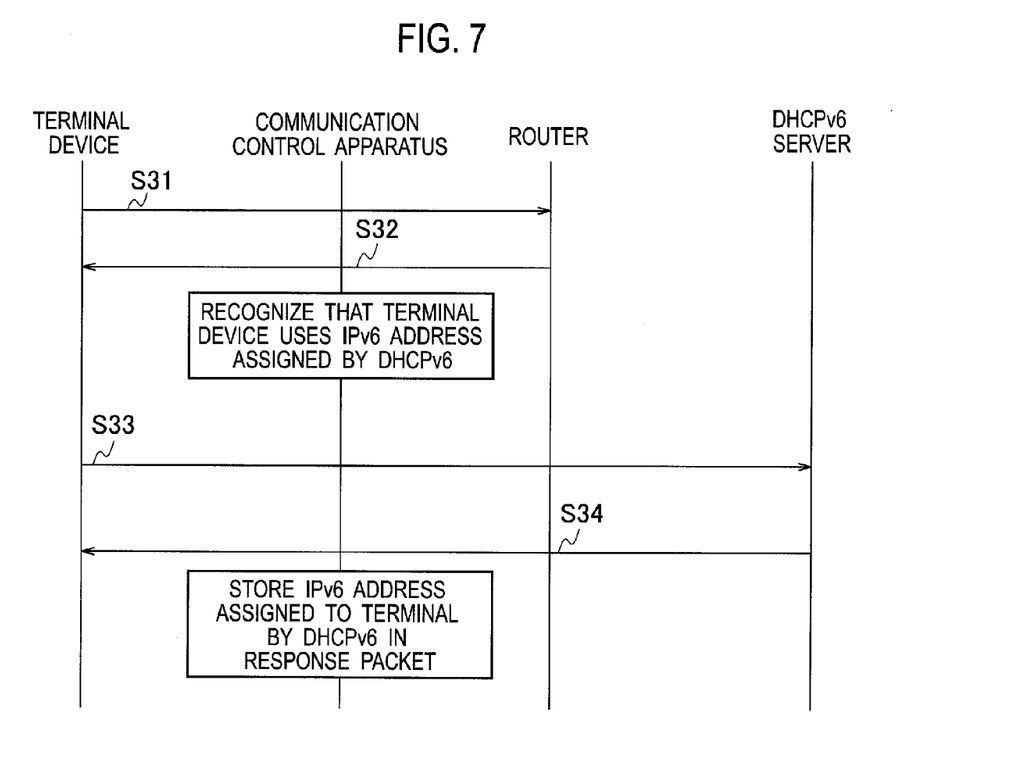
FIG. 7 is a sequence chart showing operations of a fourth example in the communication system shown as the embodiment of the present invention.

Specifically, the communication system stores the IPv6 addresses in the communication control apparatus 1 by a sequence as shown in FIG. 7.

First, when setting to assign the IPv6 address by the DHCPv6 server 5 is made at a startup time, the wireless terminal device 2 or the terminal device 4 transmits a router solicitation (RS) message S31 to the router 6. This router solicitation message S31 includes an address request of the DHCPv6 server 5 for which the wireless terminal device 2 or the terminal device 4 makes an address request. This router solicitation message S31 is supplied to the router 6 through the communication control apparatus 1.

The router 6 transmits a router advertisement message S32 in response to the router solicitation message S31 transmitted from the wireless terminal device 2 or the terminal device 4. This router advertisement message S32 includes an IPv6 address assigned to the DHCPv6 server 5 with which the wireless terminal device 2 or the terminal device 4 communicates. Moreover, in this router advertisement message S32, an M flag thereof is set at "1" in order to show that not the prefix information of the router advertisement message transmitted periodically but the IPv6 address assigned by the DHCPv6 server 5 is to be used.

At the time of being transmitted to the wireless terminal device 2 or the terminal device 4, this router advertisement message S32 is captured by the communication control apparatus 1. The communication control apparatus 1 recognizes the address information and M flag of the DHCPv6 server 5, which are included in the router advertisement message S32 concerned, and recognizes that the wireless terminal device 2 or the terminal device 4 uses the IPv6 address assigned by the DHCPv6 server 5.

In response to the fact of having received the router advertisement message S32, the wireless terminal device 2 or the terminal device 4 transmits a request message S33 for the address information to the DHCPv6 server 5 by using the address information of the DHCPv6 server 5 concerned, which is included in the router advertisement message S32.

Upon receiving the request message S33 for the address information, which is transmitted from the wireless terminal device 2 or the terminal device 4, the DHCPv6 server 5 acquires the IPv6 address to be assigned to the wireless terminal device 2 or the terminal device 4. Then, the DHCPv6 server 5 transmits a response message S34 of the address information including the IPv6 address, which is to be assigned, to the wireless terminal device 2 or the terminal device 4.

The wireless terminal device 2 or the terminal device 4 receives the response message S34 of the address information, which is transmitted from the DHCPv6 server 5, through the communication control apparatus 1. The wireless terminal device 2 or the terminal device 4 creates subsequent IPv6 packets by using the IPv6 address assigned thereto, and performs communication.

In such a way, in accordance with this communication control apparatus 1, such IPv6 packets using the IPv6 address assigned by the normal DHCPv6 server 5 are allowed to pass, and IPv6 packets using other IPv6 addresses can be discarded. Moreover, even in the case where the prefix information is transmitted periodically from the router 6 by the router advertisement message, in the case where it is set that the wireless terminal device 2 or the terminal device 4 uses the IPv6 address assigned by the DHCPv6 server 5 by the router solicitation message, a rule to block the IPv6 packets by the IPv6 address thus assigned can be automatically constructed.

Fifth Example

Still further, in this communication system, in the case where it is designated by the router advertisement message that the wireless terminal device 2 or the terminal device 4 uses the DNS server address information assigned thereto by the DHCPv6 server 5, the storage unit 12 stores the DNS server address information assigned thereto by the DHCPv6 server 5. At this time, the controller 11 determines whether or not the O flag in the router advertisement message is "1", and thereby determines that the IPv6 address of the DNS server, which is assigned from the DHCPv6 server, is to be used.

The controller 11 determines whether or not a port number in the IPv6 packet transmitted from the wireless terminal device 2 or the terminal device 4 is DNS. In the case where the port number is DNS, the controller 11 allows passing of the IPv6 packet concerned when a destination IPv6 address of the IPv6 packet concerned is included as the DNS server address information stored in the storage unit 12. Meanwhile, when the destination IPv6 address of the IPv6 packet concerned is not included as the DNS server address information stored in the storage unit 12, the controller 11 blocks the IPv6 packet concerned.

In such a way, in the case where it is designated by the router advertisement message that the IPv6 address of the DNS server 7, which is assigned by the DHCPv6 server 5, is to be used as the IPv6 address of the wireless terminal device 2 or the terminal device 4, the communication control apparatus 1 can block an IPv6 packet in which addresses other than the assigned IPv6 address of the DNS server 7 are defined as the destination IPv6 address and the transmission source IPv6 address.

Figure 8:
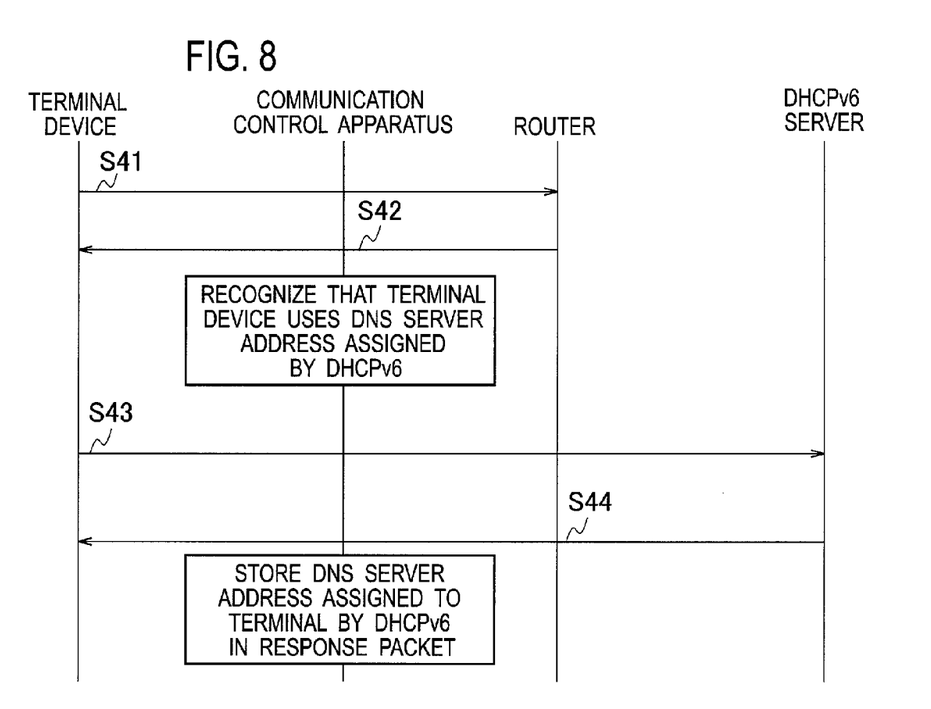
FIG. 8 is a sequence chart showing operations of a fifth example in the communication system shown as the embodiment of the present invention.

Specifically, the communication system performs operations of a sequence as shown in FIG. 8.

First, at the time of using the DHCPv6 server 5, the wireless terminal device 2 or the terminal device 4 transmits a router solicitation (RS) message) S41 to the router 6. This router solicitation message S41 includes an address request of the DHCPv6 server 5 for which the wireless terminal device 2 or the terminal device 4 makes an address request. This router solicitation message S41 is supplied to the router 6 through the communication control apparatus 1.

The router 6 transmits a router advertisement message S42 in response to the router solicitation message S41 transmitted from the wireless terminal device 2 or the terminal device 4. This router advertisement message S42 includes the IPv6 address of the DHCPv6 server 5 with which the wireless terminal device 2 or the terminal device 4 communicates. Moreover, in this router advertisement message S42, an O flag thereof is set at "1" in order to show that an IPv6 address of the DNS server, which is assigned by the DHCPv6 server 5, is to be used as the IPv6 address of the DNS server 7.

At the time of being transmitted to the wireless terminal device 2 or the terminal device 4, this router advertisement message S42 is captured by the communication control apparatus 1. The communication control apparatus 1 recognizes the address information and O flag of the DHCPv6 server 5, which are included in the router advertisement message S42 concerned, and recognizes that the wireless terminal device 2 or the terminal device 4 uses the IPv6 address of the DNS server 7, which is assigned by the DHCPv6 server 5.

In response to the fact of having received the router advertisement message S42, the wireless terminal device 2 or the terminal device 4 transmits a request message S43 for the address information of DNS server 7 concerned by using the address information of the DHCPv6 server 5, which is included in the router advertisement message S42.

Upon receiving the request message S43 for the address information of the DNS server 7, which is transmitted from the wireless terminal device 2 or the terminal device 4, the DHCPv6 server 5 acquires the IPv6 address of the DNS server 7. Then, the DHCPv6 server 5 transmits a response message S44 of the address information including the IPv6 address of the DNS server 7 to the attention of the wireless terminal device 2 or the terminal device 4.

The communication control apparatus 1 stores the IPv6 address of the DNS server 7, which is included in the response message S44 of the address information concerned. In such a way, only in the case of using the IPv6 address of the DNS server 7, which is assigned by the DHCPv6 server 5, the communication control apparatus 1 allows passing of the IPv6 packet destined to the DNS server 7 from the wireless terminal device 2 or the terminal device 4. Hence, the communication control apparatus 1 can block an IPv6 packet using an IPv6 address that uses DNS, the IPv6 address being other than the IPv6 address of the DNS server 7, which is thus assigned.

The wireless terminal device 2 or the terminal device 4 receives the response message S44 of the address information, which is transmitted from the DHCPv6 server 5, through the communication control apparatus 1. The wireless terminal device 2 or the terminal device 4 creates subsequent IPv6 packets of DNS by using the IPv6 address of the DNS server 7, which is assigned thereto by the DHCPv6 server 5, and performs communication.

In accordance with this communication control apparatus 1, the wireless terminal device 2 or the terminal device 4 is allowed to access only the DNS server 7 designated by the router advertisement message, and is thereby prevented from being guided to other unauthorized DNS servers.

Sixth Example

Still further, in the case where, immediately after the startup of the wireless terminal device 2 or the terminal device 4, the terminal device concerned sets an IP address by using the MAC address and transmits a message for sensing a duplicate address of the IP address concerned, the communication control apparatus 1 stores the MAC address of the terminal device, which is included in the message, by the storage unit 12.

The controller 11 determines whether or not a MAC address included in the IPv6 packet transmitted from the wireless terminal device 2 or the terminal device 4 coincides with the MAC address stored in the storage unit 12. In the case where the MAC address included in the IPv6 packet is stored in the storage unit 12, the controller 11 allows passing of the IPv6 packet concerned. Meanwhile, in the case where the MAC address included in the IPv6 packet is not stored in the storage unit 12, the controller 11 blocks the IPv6 packet concerned.

In such a way, the communication control apparatus 1 can block a wireless terminal device 2 or a terminal device 4, which does not perform DAD (duplicate address detection), by setting a link local address of the low-order 64 bits of the IPv6 address in a network interface by using the MAC address.

Figure 9:
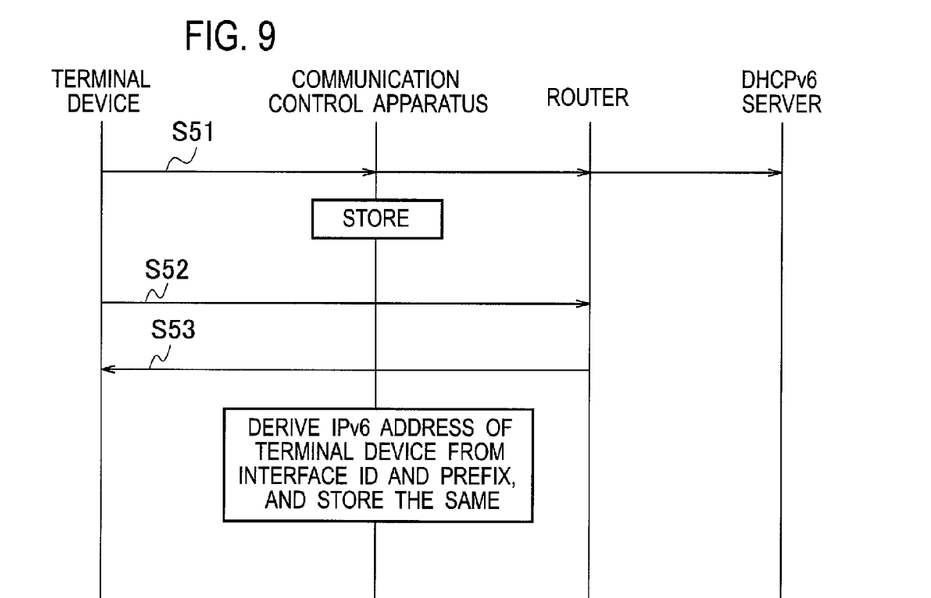
FIG. 9 is a sequence chart showing operations of a sixth example in the communication system shown as the embodiment of the present invention.

Specifically, as shown in FIG. 9, the wireless terminal device 2 or the terminal device 4 transmits a duplicate detection packet S51 of the link local address by multicast communication. This duplicate detection packet S51 is captured by the communication control apparatus 1, and also reaches the router 6 and the DHCPv6 server 5.

In this communication system, in the case where there is no other communication apparatus in which a MAC address as the link local address included in the duplicate detection packet S51 does not duplicate, a response is not transmitted to the wireless terminal device 2 or the terminal device 4, which has performed the multicast for the duplicate detection packet S51. In the case where there is no response during a predetermined time from the point of time when the duplicate detection packet S51 is captured, the communication control apparatus 1 stores the MAC address (interface ID) of the wireless terminal device 2 or the terminal device 4, which is included in the duplicate detection packet S51.

Thereafter, the wireless terminal device 2 or the terminal device 4 transmits a router solicitation message S52 to the router 6 in order to acquire the prefix information of the IPv6 address. Upon receiving the router solicitation message S52, the router 6 sends back a router advertisement message S53, which includes the prefix information, to the wireless terminal device 2 or the terminal device 4 in response to the router solicitation message S52 concerned.

Upon receiving the router advertisement message S53, the wireless terminal device 2 or the terminal device 4 creates an IPv6 address, in which the prefix information included in the router solicitation message S52 is defined as high-order 64 bits, and the interface ID of its own is defined as low-order 64 bits. In such a way, the wireless terminal device 2 or the terminal device 4 can acquire the IPv6 address of its own in the subsequent communication.

Moreover, the router advertisement message S53 is captured by the communication control apparatus 1. The communication control apparatus 1 defines the prefix information, which is included in the router solicitation message S52 concerned, as the high-order 64 bits, and defines the interface ID of the wireless terminal device 2 or the terminal device 4, which is included in the duplicate detection packet S51, as the low-order 64 bits, thereby creates the IPv6 address of the wireless terminal device 2 or the terminal device 4, and stores the created IPv6 address in the storage unit 12. In such a way, the communication control apparatus 1 can allow passing of only the IPv6 packet using the IPv6 address stored in the storage unit 12, and can block IPv6 packets using other IPv6 addresses.

Note that the above-mentioned embodiment is merely an example of the present invention. Therefore, as a matter of course, the present invention is not limited to the above-mentioned embodiment, and is modifiable in various ways in response to design and the like within the scope without departing from the technical spirit according to the present invention even if the scope covers those other than this embodiment.

INDUSTRIAL APPLICABILITY

The present invention is usable for the communication control apparatus, the communication system, and the program, which perform the passing or blocking of the communication packet.

REFERENCE SIGNS LIST

1 COMMUNICATION CONTROL APPARATUS
2 WIRELESS TERMINAL DEVICE
3 HOME INSTRUMENTS
4 TERMINAL DEVICE
5 DHCPv6 SERVER
6 ROUTER
7 DNS SERVER
8 COMMUNICATION APPARATUS
11 CONTROLLER
12 STORAGE UNIT
13 HOME NETWORK I/F
14 WIDE AREA NETWORK I/F

The invention claimed is:

1. A communication control device comprising:
  a transmitter/receiver for receiving prefix information transmitted from a router by a router advertisement, the transmitter/receiver being connected to at least the router and a terminal device that transmits/receives a communication packet thereto/therefrom;
  a storage for storing the prefix information received by the transmitter/receiver; and
  a controller for blocking the communication packet received by the transmitter/receiver in a case where prefix information of a transmission source address or a destination address, the prefix information being included in the communication packet, is different from the prefix information stored in the storage, and allowing passing of the received communication packet in a case where the prefix information of the transmission source address or the destination address, the prefix information being included in the communication packet, is the prefix information stored in the storage,
  wherein, in a case where DNS (Domain Name System) server information is transmitted to the transmitter/receiver by the router advertisement, the storage stores DNS server address information included in the DNS server information, and
  in a case where a destination address of a communication packet transmitted from the terminal device is the DNS server address stored in the storage, the controller allows passing of the communication packet, and in a case where the destination address included in the communication packet is different from the DNS server address stored in the storage, the controller blocks the communication packet.

2. A communication control device comprising:
  a transmitter/receiver for receiving prefix information transmitted from a router by a router advertisement, the transmitter/receiver being connected to at least the router and a terminal device that transmits/receives a communication packet thereto/therefrom;
  a storage for storing the prefix information received by the transmitter/receiver; and
  a controller for blocking the communication packet received by the transmitter/receiver in a case where prefix information of a transmission source address or a destination address, the prefix information being included in the communication packet, is different from the prefix information stored in the storage, and allowing passing of the received communication packet in a case where the prefix information of the transmission source address or the destination address, the prefix information being included in the communication packet, is the prefix information stored in the storage,
  wherein, in a case where a reachable time of the terminal device is designated by the router advertisement, the storage stores in advance the reachable time and a point of time when a reachability confirmation packet of a communication packet transmitted from the terminal device is received by the transmitter/receiver, and
  in a case where a time from the point of time when the reachability confirmation packet is received until a point of time when the communication packet transmitted from the terminal device is received does not exceed the reachable time for the terminal device, the controller allows passing of the communication packet, and in a case where the time from the point of time when the reachability confirmation packet is received until the point of time when the communication packet transmitted from the terminal device is received exceeds the reachable time for the terminal device, the controller blocks the communication packet until next receiving the reachability confirmation packet from the terminal device.

3. A communication control device comprising:
a transmitter/receiver for receiving prefix information transmitted from a router by a router advertisement, the transmitter/receiver being connected to at least the router and a terminal device that transmits/receives a communication packet thereto/therefrom;
a storage for storing the prefix information received by the transmitter/receiver; and
a controller for blocking the communication packet received by the transmitter/receiver in a case where prefix information of a transmission source address or a destination address, the prefix information being included in the communication packet, is different from the prefix information stored in the storage, and allowing passing of the received communication packet in a case where the prefix information of the transmission source address or the destination address, the prefix information being included in the communication packet, is the prefix information stored in the storage,
wherein the transmitter/receiver is connected to a DHCP (Dynamic Host Configuration Protocol) server,
wherein, in a case where it is designated by the router advertisement that the terminal device uses DNS server address information assigned thereto by the DHCP server, the storage stores the DNS server address information assigned by the DHCP server, and
in a case where a port number in a communication packet transmitted from the terminal device is DNS, the controller allows passing of the communication packet when a destination address of the communication packet is included as the DNS server address information stored in the storage, and blocks the communication packet when the destination address of the communication packet is not included as the DNS server address information stored in the storage.

4. A communication system comprising:
a terminal device that transmits/receives a communication packet;
a router that transmits prefix information by a router advertisement, and relays the communication packet transmitted/received by the terminal device; and
a communication control device that controls blocking and passing of the communication packet,
wherein the communication control device includes:
a transmitter/receiver for receiving the prefix information transmitted from the router by the router advertisement, the transmitter/receiver being connected to at least the router and the terminal device;
a storage for storing the prefix information received by the transmitter/receiver; and
a controller for blocking the communication packet received by the transmitter/receiver in a case where prefix information of a transmission source address or a destination address, the prefix information being included in the communication packet, is different from the prefix information stored in the storage, and allowing passing of the received communication packet in a case where the prefix information of the transmission source address or the destination address, the prefix information being included in the communication packet, is the prefix information stored in the storage,
wherein, in a case where DNS (Domain Name System) server information is transmitted to the transmitter/receiver by the router advertisement, the storage stores DNS server address information included in the DNS server information, and
in a case where a destination address of a communication packet transmitted from the terminal device is the DNS server address stored in the storage, the controller allows passing of the communication packet, and in a case where the destination address included in the communication packet is different from the DNS server address stored in the storage, the controller blocks the communication packet.

5. A communication system comprising:
a terminal device that transmits/receives a communication packet;
a router that transmits prefix information by a router advertisement, and relays the communication packet transmitted/received by the terminal device; and
a communication control device that controls blocking and passing of the communication packet,
wherein the communication control device includes:
a transmitter/receiver for receiving the prefix information transmitted from the router by the router advertisement, the transmitter/receiver being connected to at least the router and the terminal device;
a storage for storing the prefix information received by the transmitter/receiver; and
a controller for blocking the communication packet received by the transmitter/receiver in a case where prefix information of a transmission source address or a destination address, the prefix information being included in the communication packet, is different from the prefix information stored in the storage, and allowing passing of the received communication packet in a case where the prefix information of the transmission source address or the destination address, the prefix information being included in the communication packet, is the prefix information stored in the storage,
wherein, in a case where a reachable time of the terminal device is designated by the router advertisement, the storage stores in advance the reachable time and a point of time when a reachability confirmation packet of a communication packet transmitted from the terminal device is received by the transmitter/receiver, and
in a case where a time from the point of time when the reachability confirmation packet is received until a point of time when the communication packet transmitted from the terminal device is received does not exceed the reachable time for the terminal device, the controller allows passing of the communication packet, and in a case where the time from the point of time when the reachability confirmation packet is received until the point of time when the communication packet transmitted from the terminal device is received exceeds the reachable time for the terminal device, the controller blocks the communication packet until next receiving the reachability confirmation packet from the terminal device.

6. A communication system comprising:
a terminal device that transmits/receives a communication packet;
a router that transmits prefix information by a router advertisement, and relays the communication packet transmitted/received by the terminal device; and
a communication control device that controls blocking and passing of the communication packet,
wherein the communication control device includes:
a transmitter/receiver for receiving the prefix information transmitted from the router by the router advertisement, the transmitter/receiver being connected to at least the router and the terminal device;

a storage for storing the prefix information received by the transmitter/receiver; and a controller for blocking the communication packet received by the transmitter/receiver in a case where prefix information of a transmission source address or a destination address, the prefix information being included in the communication packet, is different from the prefix information stored in the storage, and allowing passing of the received communication packet in a case where the prefix information of the transmission source address or the destination address, the prefix information being included in the communication packet, is the prefix information stored in the storage, wherein the transmitter/receiver is connected to a DHCP (Dynamic Host Configuration Protocol) server, wherein, in a case where it is designated by the router advertisement that the terminal device uses DNS server address information assigned thereto by the DHCP server, the storage stores the DNS server address information assigned by the DHCP server, and in a case where a port number in a communication packet transmitted from the terminal device is DNS, the controller allows passing of the communication packet when a destination address of the communication packet is included as the DNS server address information stored in the storage, and blocks the communication packet when the destination address of the communication packet is not included as the DNS server address information stored in the storage.

\* \* \* \* \*